(12) United States Patent
Ontl et al.

(10) Patent No.: US 10,493,611 B2
(45) Date of Patent: Dec. 3, 2019

(54) CONTROL METHOD FOR A HAND-HELD POWER TOOL

(71) Applicant: Hilti Aktiengesellschaft, Schaan (LI)

(72) Inventors: Rainer Ontl, Landsberg am Lech (DE); Damir Cehajic, Durach (DE); Christoph Dieing, Isny (DE)

(73) Assignee: Hilti Aktiengesellschaft, Schaan (LI)

( * ) Notice: Subject to any disclaimer, the term of this patent is extended or adjusted under 35 U.S.C. 154(b) by 256 days.

(21) Appl. No.: 15/532,597

(22) PCT Filed: Dec. 1, 2015

(86) PCT No.: PCT/EP2015/078176
§ 371 (c)(1),
(2) Date: Jun. 2, 2017

(87) PCT Pub. No.: WO2016/087426
PCT Pub. Date: Jun. 9, 2016

(65) Prior Publication Data
US 2017/0361447 A1    Dec. 21, 2017

(30) Foreign Application Priority Data

Dec. 3, 2014    (EP) .................................... 14196019

(51) Int. Cl.
*B25D 17/24*    (2006.01)
*F16F 7/104*    (2006.01)

(52) U.S. Cl.
CPC .............. *B25D 17/24* (2013.01); *F16F 7/104* (2013.01); *B25D 2211/068* (2013.01);
(Continued)

(58) Field of Classification Search
CPC .............. B25D 17/24; B25D 2250/175; B25D 2216/0038; B25D 2217/0092;
(Continued)

(56) References Cited

U.S. PATENT DOCUMENTS 2,875,731 A * 3/1959 Settles .................... B25D 17/24
173/162.2
3,845,827 A * 11/1974 Schulin ............... B27B 17/0033
16/429
(Continued)

FOREIGN PATENT DOCUMENTS

| CN | 101733735 | 6/2010 |
| DE | 102012221517 | 5/2014 |
| EP | 2189249 | 5/2010 |

*Primary Examiner* — Robert F Long
(74) *Attorney, Agent, or Firm* — Davidson, Davidson & Kappel, LLC

(57) ABSTRACT

The hand-held power tool has a tool holder (2) for holding a tool (4) along a working axis (12). A hammer mechanism (6) has a striker (15) that is moved periodically along the working axis at an impact rate. A drive control (18) of the hammer mechanism (6) sets the impact rate to a set point value. A vibration absorber (19) has an oscillator (21) that moves along the working axis (12) about a resting position and one or multiple springs (20) that drive the oscillator (21) back into the resting position. A calibration phase comprises the following steps: detection of an acceleration using the acceleration sensor (24); determination of a minimum of the acceleration by varying the impact rate in a range of between 90% and 110% of the set point value; and adjusting the set point to the impact rate associated with the ascertained minimum.

7 Claims, 1 Drawing Sheet

(52) U.S. Cl.
CPC ............... *B25D 2216/0038* (2013.01); *B25D 2217/0092* (2013.01); *B25D 2250/005* (2013.01); *B25D 2250/175* (2013.01); *B25D 2250/201* (2013.01); *B25D 2250/221* (2013.01)

(58) Field of Classification Search
CPC ........ B25D 2250/221; B25D 2250/201; B25D 2250/005; B25D 2211/068; F16F 7/104
USPC ................................ 173/1–2, 5–11, 176–183
See application file for complete search history.

(56) References Cited

U.S. PATENT DOCUMENTS

| | | | | |
|---|---|---|---|---|
| 4,014,392 | A * | 3/1977 | Ross | B25D 11/125 173/118 |
| 4,282,938 | A * | 8/1981 | Minamidate | B25D 17/043 173/162.2 |
| 4,316,512 | A * | 2/1982 | Kibblewhite | G01D 5/24404 173/183 |
| 4,478,293 | A * | 10/1984 | Weilenmann | B25D 17/043 173/162.2 |
| 5,176,026 | A * | 1/1993 | Leeb | G01N 3/52 73/79 |
| 5,546,786 | A * | 8/1996 | Fugel | B21D 1/06 72/457 |
| 6,863,479 | B2 * | 3/2005 | Frauhammer | B25D 17/043 16/426 |
| 6,948,570 | B2 * | 9/2005 | Kristen | B25D 17/00 173/162.1 |
| 6,962,211 | B2 * | 11/2005 | Daubner | B25D 17/24 173/162.1 |
| 7,204,322 | B2 * | 4/2007 | Sakai | B25D 11/125 173/117 |
| 7,383,895 | B2 * | 6/2008 | Aoki | B25D 16/00 173/109 |
| 7,451,833 | B2 * | 11/2008 | Hahn | B25D 17/24 173/104 |
| 7,500,527 | B2 * | 3/2009 | Fischer | B25D 17/043 173/162.2 |
| 7,588,097 | B2 * | 9/2009 | Kamegai | B25D 11/062 173/109 |
| 7,604,071 | B2 * | 10/2009 | Ikuta | B25D 17/24 173/122 |
| 7,766,096 | B2 * | 8/2010 | Satou | B25D 17/24 173/109 |
| 7,806,201 | B2 * | 10/2010 | Aoki | B23D 51/16 173/162.2 |
| 20,279,741 | | 11/2012 | Schlesak et al. | |
| 8,434,565 | B2 * | 5/2013 | Hecht | B25D 17/24 173/162.1 |
| 8,813,537 | B1 * | 8/2014 | Diego | B21D 1/06 173/122 |
| 2004/0119467 | A1 * | 6/2004 | Sondergeld | B60R 21/013 324/207.26 |
| 2004/0200628 | A1 * | 10/2004 | Schmitzer | B25D 16/006 173/1 |
| 2004/0226728 | A1 * | 11/2004 | Boeni | B25D 11/005 173/2 |
| 2006/0086515 | A1 * | 4/2006 | Engelfried | B25D 17/043 173/162.2 |
| 2006/0102365 | A1 * | 5/2006 | Phillips | B25C 1/047 173/130 |
| 2008/0179152 | A1 * | 7/2008 | Moessnang | B25D 16/006 188/380 |
| 2009/0151967 | A1 * | 6/2009 | Haas | B25D 17/24 173/162.1 |
| 2009/0188686 | A1 * | 7/2009 | Keskiniva | B25D 9/26 173/1 |
| 2009/0218114 | A1 * | 9/2009 | Ohlendorf | B23D 51/00 173/211 |
| 2009/0250233 | A1 * | 10/2009 | Wallace | B25B 23/1405 173/1 |
| 2010/0224383 | A1 * | 9/2010 | John | B25D 11/125 173/201 |
| 2010/0236801 | A1 * | 9/2010 | Furusawa | B25D 11/10 173/47 |
| 2011/0024149 | A1 * | 2/2011 | Hecht | B25D 17/24 173/162.2 |
| 2011/0155405 | A1 * | 6/2011 | Aoki | B25D 17/245 173/162.2 |
| 2011/0303429 | A1 * | 12/2011 | Kohlschmied | B25D 11/005 173/112 |
| 2012/0103643 | A1 * | 5/2012 | Binder | B25D 16/003 173/2 |
| 2012/0261153 | A1 * | 10/2012 | Aoki | B25D 16/00 173/162.1 |
| 2013/0133912 | A1 * | 5/2013 | Mizuno | B25B 23/1405 173/180 |
| 2014/0102741 | A1 * | 4/2014 | Sekino | B25B 21/02 173/181 |
| 2015/0367492 | A1 * | 12/2015 | Lindell | B25D 17/24 173/211 |
| 2016/0375570 | A1 * | 12/2016 | Boeck | B24B 23/028 700/169 |
| 2018/0001462 | A1 * | 1/2018 | Ontl | B25D 11/125 |
| 2018/0370008 | A1 * | 12/2018 | Peters | B25D 16/006 |

\* cited by examiner

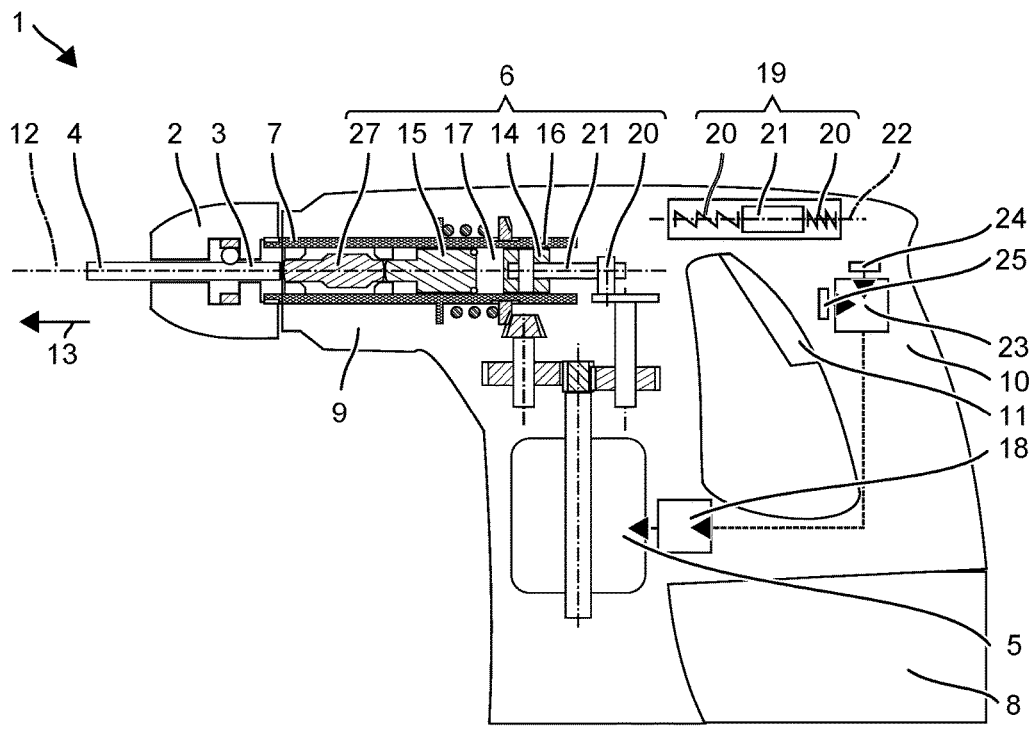

CONTROL METHOD FOR A HAND-HELD POWER TOOL

TECHNICAL FIELD OF THE INVENTION

The present invention relates to a control method for a hand-held power tool including a vibration absorber for damping periodic vibrations.

U.S. Pat. No. 8,434,565 B2 describes a hammer drill whose hammer mechanism drives a bit at an impact frequency into a substrate. The vibrations which occur at the impact frequency are damped by a vibration absorber. The vibration absorber includes a freely suspended oscillator which is capable of oscillating back and forth out of a resting position along the impact direction. Springs drive the oscillator back into the resting position after a deflection. The mass of the oscillator and the resilience of the springs are adapted to the impact frequency.

SUMMARY OF THE INVENTION

Control method for a hand-held power tool. The hand-held power tool includes a tool holder for holding a tool on a working axis. A hammer mechanism includes a striker which is moved periodically at an impact rate on the working axis. A drive control of the hammer mechanism sets the impact rate to a setpoint value. A vibration absorber includes an oscillator which is movable along the working axis about a resting position and one or multiple spring(s) which drive(s) the oscillator back into the resting position. A calibration phase includes the following steps: detecting an acceleration with the aid of the acceleration sensor, ascertaining a minimum of the acceleration by varying the impact rate in a range between 90% and 110% of the setpoint value, and adjusting the setpoint value to the impact rate associated with the ascertained minimum.

BRIEF DESCRIPTION OF THE DRAWING

The following description elucidates the present invention based on exemplary specific embodiments and the drawing.

FIG. 1 shows a hammer drill,

In the drawing, elements which are identical or have identical functions are identified with identical reference numerals, unless otherwise indicated.

DETAILED DESCRIPTION

FIG. 1 schematically shows a hammer drill 1 as an example of a hand-held power tool. Hammer drill 1 includes a tool holder 2 into which a shaft end 3 of a tool, for example of a drill bit 4, may be inserted. In the case of a primary drive, hammer drill 1 is driven by a motor 5 which drives a hammer mechanism 6 and an output shaft 7. A battery pack 8 or a mains line supplies motor 5 with power. Pneumatic hammer mechanism 6 and preferably the other driving components are situated within a machine housing 9. A user may guide hammer drill 1 with the aid of a handle 10 which is fastened to machine housing 9. Motor 5 and thus hammer drill 1 may be started up with the aid of a system switch 11. During operation, hammer drill 1 continuously rotates drill bit 4 about a working axis 12 and is capable of driving drill bit 4 into a substrate in impact direction 13 along working axis 12.

Pneumatic hammer mechanism 6 includes an exciter 14 and a striker 15 which are movably guided in a guiding tube 16 along working axis 12. Exciter 14 and striker 15 close pneumatic chamber 17 in-between each other. Exciter 14 is periodically moved back and forth on working axis 12 by motor 5. Pneumatic chamber 17 forms a pneumatic spring which connects striker 15 to the movement of exciter 14. The cycle duration is predefined by the forced movement of exciter 14. A motor controller 18 controls the rotational speed of motor 5 to a setpoint value. The rotational speed predefines the cycle duration. The setpoint value of the rotational speed is configured to provide for an efficient pneumatic coupling of striker 15 to exciter 14. The impact rate of hammer mechanism 6 is inverse to the cycle duration and is typically in the range between 10 Hz and 100 Hz.

The periodic movements of exciter 14 and striker 15 introduce vibrations into machine housing 9 which are transferred to handle 10. The user in particular feels the acceleration of striker 15 at the compression point.

A vibration absorber 19 in machine housing 9 reduces the amplitude of the vibrations. Vibration absorber 19 includes an oscillator 21 which is suspended on one or multiple spring(s) 20. The inertia of oscillator 21 effectuates a relative movement of oscillator 21 in relation to vibrating machine housing 9. The periodic vibrations of hammer mechanism 6 along working axis 12 result in a periodic deflection of oscillator 21 in relation to a resting position in machine housing 9. Only springs 20 connect oscillator 21 to machine housing 9 and to handle 10 and exert a restoring force into the resting position on oscillator 21 in the case of a deflection. Oscillator 21 oscillates between a turning point which is close to the tool and a turning point which is remote from the tool. The periodicity is equal to the impact frequency of the periodic excitation. The amplitude of deflection is a function of the amplitude of the vibrations and the impact frequency.

Exemplary vibration absorber 19 includes an oscillator 21 which is guided in a linear bearing along an axis 22. Axis 22 is parallel to or inclined by less than 30 degrees in relation to working axis 12. Springs 20 are, for example, coil springs with the aid of which oscillator 21 is supported along axis 22 on machine housing 9. An alternative vibration absorber includes an oscillator which is guided on a bent pathway. The oscillator is suspended on machine housing 9 via an oscillating arm. The oscillating arm is a flexible spring which is situated perpendicularly to the working axis.

Oscillating vibration absorber 19 effectuates a reduction of the vibrations transferred to handle 10. The reduction does not take place through a dissipative effect of vibration absorber 19. Vibration absorber 19, together with hammer mechanism 6, rather forms a contiguous oscillating system, having a nodal point of vibration. The system is coordinated in such a way that the connecting point of the system to machine housing 9 and handle 10 coincides with the nodal point of vibration. The optimal reduction is achieved when the impact frequency is equal to the natural frequency of vibration absorber 19. The natural frequency is the frequency at which vibration absorber 19 oscillates after being deflected once without further excitation. The natural frequency is predefined by the mass of oscillator 21 and the stiffness of springs 20. The natural frequency may change over the lifetime, in particular the effective stiffness of springs 20 changes.

Vibration absorber 19 includes a damping controller 23 which modifies the rotational speed of motor 5 for the purpose of optimizing the vibration reduction by vibration absorber 19. Damping controller 23 includes an acceleration sensor 24 which detects accelerations or vibrations at handle 10 or machine housing 9 along working axis 12. Damping controller 23 adapts the rotational speed of motor 5 to vibration absorber 19 during a calibration phase.

Exemplary damping controller 23 includes a data memory 25 in which a most recently determined setpoint value for the impact rate of hammer mechanism 6 or the setpoint rotational speed of motor 5 is stored. The setpoint value preferably corresponds to the natural frequency of vibration absorber 19 or is just below it, e.g., between 90% and 100% of the natural frequency, preferably between 95% and 100% of the natural frequency. In a new unit, a natural frequency which is predefined to the specifications of vibration absorber 19 may be stored as the setpoint value in data memory 25. The setpoint value for the impact rate and the setpoint rotational speed of motor 5 differ only by a fixed factor which is predefined by a gear reduction ratio.

Motor 5 is accelerated to the setpoint value when hammer drill 1 is switched on by actuating system switch 11, for example. Damping controller 23 may carry out the calibration directly after the tool has been switched on.

An exemplary calibration provides that the rotational speed of hammer drill 1 is reduced stepwise or continuously in relation to the setpoint rotational speed. While the rotational speed is being reduced, damping controller 23 detects the amplitude of the acceleration detected by acceleration sensor 24. The vibrations change due to hammer mechanism 6 and vibration absorber 19. Hammer mechanism 6 forms the source for the vibrations. Reduced performance of hammer mechanism 6 accordingly results in fewer vibrations. However, an arbitrary reduction is not desirable, since hammer mechanism 6 is to be operated at maximum impact power and minor vibrations. It proves to be that the effect of vibration absorber 19, which depends heavily on the frequency, may be used to adapt vibration absorber 19. The rotational speed is reduced until the vibrations increase again due to the declining effect of vibration absorber 19. The reduction of the rotational speed is terminated. The rotational speed at which the vibration minimum is established is stored as the new setpoint value in data memory 25. The calibration is terminated. The rotational speed of motor 5 is adjusted to the new setpoint value.

The reduction of the rotational speed is stopped when a minimum rotational speed is fallen below without a local vibration minimum being established. The minimum rotational speed is, for example, 90% of the setpoint value. A further reduction of the rotational speed is unfavorable. The calibration increases the rotational speed starting from the setpoint value. Hammer mechanism 6 typically generates more vibrations as the rotational speed increases. The effect of vibration absorber 19 typically dominates the vibration behavior. The rotational speed is increased until a drop in the vibrations and a following increase in the vibrations is detected. The rotational speed at the ascertained minimum is stored as the new setpoint value. The calibration is terminated. The increase in the rotational speed is aborted if the rotational speed exceeds a maximum rotational speed. The maximum rotational speed is 110% of the setpoint value.

What is claimed is:

1. A control method for a hand-held power tool including a machine housing, a handle fastened to the machine housing for guiding the hand-held power tool during operation, a tool holder for holding a tool on a working axis, a hammer mechanism including a striker moving periodically at an impact rate on the working axis, a drive control of the hammer mechanism setting the impact rate to a setpoint value, a vibration absorber including an oscillator moving with respect to the working axis back and forth from a resting position and at least one spring driving the oscillator back into the resting position, an acceleration sensor attached to a machine housing for detecting accelerations along the working axis, the control method comprising a calibration phase having the following steps:

detecting an acceleration with the aid of the acceleration sensor;

ascertaining a minimum of the acceleration by varying the impact rate in a range between 90% and 110% of the setpoint value;

adjusting the setpoint value to the impact rate associated with the ascertained minimum; and driving the hammer mechanism at the impact rate adjusted to the setpoint value.

2. The control method as recited in claim 1 wherein the at least one spring includes a first spring on one side of the oscillator and a second spring on another side of the oscillator.

3. The control method as recited in claim 1 wherein the oscillator moves back and forth guided in a linear bearing along a linear bearing axis parallel or inclined less than 30 degrees in relation to the working axis.

4. The control method as recited in claim 1 further comprising storing a most recently determined setpoint value of the setpoint value of the impact rate in a data memory.

5. The control method as recited in claim 1 further comprising accelerating the motor to the setpoint value using an actuating system switch.

6. The control method as recited in claim 1 further comprising stepwise reducing a rotational speed of the power tool in relation to a setpoint rotational speed during the calibration phase.

7. The control method as recited in claim 1 further comprising continuously reducing a rotational speed of the power tool in relation to a setpoint rotational speed during the calibration phase.

* * * * *